(12) United States Patent
Mironov

(10) Patent No.: US 8,899,546 B2
(45) Date of Patent: Dec. 2, 2014

(54) WIND BLADE MOULD INCLUDING A HEATING SYSTEM

(75) Inventor: Gabriel Mironov, Montreal (CA)

(73) Assignee: Suzhou Red Maple Wind Blade Mould Co., Ltd., Jiangsu (CN)

(*) Notice: Subject to any disclaimer, the term of this patent is extended or adjusted under 35 U.S.C. 154(b) by 0 days.

(21) Appl. No.: 13/395,309

(22) PCT Filed: Sep. 9, 2010

(86) PCT No.: PCT/CN2010/001384
§ 371 (c)(1),
(2), (4) Date: Apr. 10, 2012

(87) PCT Pub. No.: WO2011/029274
PCT Pub. Date: Mar. 17, 2011

(65) Prior Publication Data
US 2012/0187273 A1   Jul. 26, 2012

(30) Foreign Application Priority Data
Sep. 11, 2009   (CN) .......................... 2009 1 0169177

(51) Int. Cl.
| | |
|---|---|
| *B29C 33/04* | (2006.01) |
| *B29C 35/04* | (2006.01) |
| *B29C 33/38* | (2006.01) |
| B21D 37/16 | (2006.01) |
| B28B 7/42 | (2006.01) |
| B29L 31/08 | (2006.01) |
| B29L 31/00 | (2006.01) |

(52) U.S. Cl.
CPC .............. *B29C 35/041* (2013.01); *B29C 33/04* (2013.01); *B29C 33/38* (2013.01); *B21D 37/16* (2013.01); *B28B 7/42* (2013.01); *B29L 2031/085* (2013.01); *B29C 2033/042* (2013.01); *B29C 2035/042* (2013.01); *B29L 2031/082* (2013.01); *B29L 2031/7498* (2013.01)
USPC .......... 249/80; 249/114.1; 249/115; 249/116; 249/134; 249/135

(58) Field of Classification Search
CPC ........ B29C 33/02; B29C 35/02; B29C 33/04; B29C 33/38; B29C 35/041; B29C 2035/042; B29C 2033/042; B21D 37/16; B22D 27/04; B28B 7/42; H05B 6/14; B23K 13/01; B29L 2031/082; B29L 2031/7498; B29L 2031/085
USPC ........... 425/407; 249/78–81, 114.1–116, 134, 249/135; 264/259, 319, 403, 486, 487, 496; 219/618, 632, 634; 148/574; 156/282
See application file for complete search history.

(56) References Cited

U.S. PATENT DOCUMENTS 1,357,343 A * 11/1920 Novotny ........................ 425/384
3,118,960 A *  1/1964 Cook ............................ 264/230
(Continued)

FOREIGN PATENT DOCUMENTS

| CN | 200995458 Y | 12/2007 |
|---|---|---|
| CN | 101439559 A | 5/2009 |

(Continued)

OTHER PUBLICATIONS

Translation of CN 101439559. (Date is not applicable).*

(Continued)

*Primary Examiner* — Dimple Bodawala

(74) *Attorney, Agent, or Firm* — Novak Druce Connolly Bove + Quigg LLP

(57) ABSTRACT

A mold for molding a wind turbine blade, the mold comprising a mold body having a front molding surface and a rear face, the mold body having at least one tube therein for conveying a heating liquid therethrough, the at least one tube defining a plurality of laterally spaced heating elements, and a continuous layer of heat conductive material located in the thickness direction of the mold body between the plurality of laterally spaced heating elements and the front molding surface and extending laterally across the space between adjacent heating elements.

23 Claims, 4 Drawing Sheets

(56) References Cited

U.S. PATENT DOCUMENTS

| | | | | |
|---|---|---|---|---|
| 3,179,725 | A | * | 4/1965 | Shultz et al. ............... 264/220 |
| 5,188,692 | A | * | 2/1993 | Horvath ...................... 156/212 |
| 5,260,014 | A | * | 11/1993 | Holton et al. ............... 264/134 |
| 5,989,008 | A | * | 11/1999 | Wytkin ........................ 425/432 |
| 6,040,362 | A | * | 3/2000 | Mine et al. .................. 523/212 |
| 6,309,587 | B1 | * | 10/2001 | Gniatczyk et al. ........... 264/510 |
| 6,415,640 | B1 | * | 7/2002 | Haussermann ................ 72/350 |
| 6,884,966 | B2 | * | 4/2005 | Coleman et al. ............. 219/243 |
| 7,066,000 | B2 | * | 6/2006 | Hammar ..................... 72/342.92 |
| 7,165,434 | B2 | * | 1/2007 | Vinnen et al. ............... 72/342.3 |
| 7,205,516 | B2 | * | 4/2007 | Fishman et al. ............. 219/633 |
| 8,403,659 | B2 | * | 3/2013 | Szokolay ..................... 425/385 |
| 2003/0070752 | A1 | * | 4/2003 | Bergevin et al. ............. 156/297 |
| 2004/0058027 | A1 | * | 3/2004 | Guichard et al. ........... 425/174.6 |
| 2007/0039609 | A1 | * | 2/2007 | Huebner et al. ............. 126/570 |
| 2008/0254162 | A1 | * | 10/2008 | Iimura et al. ................ 425/547 |
| 2010/0140448 | A1 | * | 6/2010 | Koerwien ...................... 249/78 |
| 2010/0201040 | A1 | * | 8/2010 | Guichard et al. ............. 264/403 |
| 2010/0230575 | A1 | * | 9/2010 | Mironov ........................ 249/78 |
| 2010/0282442 | A1 | * | 11/2010 | Sukuvoy .................. 165/104.19 |
| 2011/0198013 | A1 | * | 8/2011 | Christiansen et al. .......... 156/64 |
| 2012/0145703 | A1 | * | 6/2012 | Matsen et al. ............... 219/618 |
| 2013/0113141 | A1 | * | 5/2013 | Sorensen ...................... 264/404 |

FOREIGN PATENT DOCUMENTS

| | | | | | |
|---|---|---|---|---|---|
| EP | 722826 | A2 | * | 7/1996 | ............. B29C 70/48 |
| GB | 2494489 | B | * | 8/2013 | ............. B29C 44/06 |
| JP | 55037310 | A | * | 3/1980 | ............. B29D 27/04 |
| JP | 59-64218 | | * | 4/1984 | ............... B29C 1/00 |
| JP | 3231460 | B2 | | 10/1994 | |
| JP | 6285866 | A | | 10/1994 | |
| JP | 08145386 | F1 | * | 6/1996 | ............. F24D 7/00 |
| JP | 2003145576 | A | * | 5/2003 | ............. B29C 45/16 |
| WO | WO 00/54949 | A2 | * | 9/2000 | ............. B29C 70/00 |
| WO | WO 2012/086471 | A1 | * | 6/2012 | ............. B29C 70/06 |

OTHER PUBLICATIONS

Sep. 27, 2013 First Office Action in corresponding CN Application 201080040063.X (with English Translation).

Dec. 16, 2010 International Search Report and Written Opinion in Application No. PCT/CN2010/001384.

The International Search Report and Written Opinion in PCT/CN2010/001384 mailed Dec. 16, 2010.

* cited by examiner

WIND BLADE MOULD INCLUDING A HEATING SYSTEM

TECHNICAL FIELD OF THE INVENTION

The present invention relates to a mould for moulding a wind turbine blade, and a method of moulding a wind turbine blade using such a mould.

BACKGROUND OF THE INVENTION

Moulds for moulding a wind turbine blade are known in the art. Wind turbine blades can have a very large surface area, for example a length of up to 60 meters and a width of up to 5 meters. The blade surfaces are typically composed of fibre-reinforced resin matrix composite material which is moulded in the mould. The large mass of resin matrix material to be cured in a curing cycle means that heating of the mould is generally required to accelerate curing in order to control the curing cycle and ensure uniform and complete resin curing within a commercially acceptable curing cycle time.

It is known to provide tubes within the mould through which a heating fluid is passed to heat the mould surface during the curing cycle. However, such known mould incorporating heating systems are thermally inefficient, complex and expensive to manufacture.

In the past, it has been popular all over the world to heat wind turbine blade moulds by using water.

However this has the following disadvantages:
1. In winter time, the water can freeze, destroying the piping in the mould.
2. The water can cause corrosion in the pipes, destroying the mould.
3. Without pressure, heating over 90 C cannot be achieved.
4. If using pressurized water to achieve higher temperatures, dangerous leakage or explosion can occur. Also a safety inspection is needed for pressurized boilers.
5. If impure water is used, salt deposits can form inside the pipes, blocking them.

Effectively this has resulted in the limiting temperature for water boiler systems used for blade mould heating being set at 90 C. Since temperatures up to 80 C are needed for blade production, this causes a longer blade production cycle. The heating from 60 C up to 80 C becomes slower and slower as the blade mould temperature approaches the boiler temperature. This is because the effective heat transfer capability of the fluid drops further and further with the lessened temperature differential.

Further, an epoxy-fiberglass blade mould should be post-cured at a temperature of at least 110 C before use, in order to drive the curing of the mould shell to completion and get the most durable mould laminate. This cannot be achieved with a water heating system.

It has also been suggested to use silicone oil for heating, which would allow much higher boiler temperatures without pressure. However using such oil could cause silicone contamination inside the blade workshop. Silicone contamination would likely provoke failed gluing of the wind turbine blade, or defects in the blade painting. It is well known that any trace of silicone contamination is extremely harmful to adhesive bonding of all kinds.

So effectively until today, all blade moulds make use of electric heating, air heating, or water heating. In the short history of the wind blade production industry, no other heat transfer fluids have been discovered or used successfully.

SUMMARY OF THE INVENTION

The present invention aims at least partially to overcome these problems of known moulds for moulding wind turbine blades.

Accordingly, the present invention provides a mould for moulding a wind turbine blade, the mould comprising a mould body having a front moulding surface and a rear face, the mould body having at least one tube therein for conveying a heating liquid therethrough, the at least one tube defining a plurality of laterally spaced heating elements, and a continuous layer of heat conductive material located in the thickness direction of the mould body between the plurality of laterally spaced heating elements and the front moulding surface and extending laterally across the space between adjacent heating elements.

Optionally, the continuous layer of heat conductive material is a mesh. The mesh may be composed of aluminum, copper, or carbon fibres, or a mixture of at least two of these metals.

Optionally, the mould body comprises a sandwich construction having a central core layer between rear and front layers, the at least one tube is disposed between the core layer and the front layer, and the continuous layer of heat conductive material is disposed within the front layer.

Typically, the continuous layer of heat conductive material is disposed between rear and front laminate layers of the front layer, the front laminate layer defining the moulding surface. Preferably, the core layer is composed of a lightweight material selected from polymeric foam, for example composed of polyethylene terephthalate, or balsa wood. The core layer is desirably from 6 to 50 mm thick.

The tube is typically received in a channel formed in a front surface of the core layer, so that each spaced heating element is in a respective channel and the channels of the spaced heating elements are correspondingly laterally spaced. The channel may have a triangular or trapezoidal cross-section. The channel is preferably filled with a heat conducting paste which surrounds the tube in the channel. The heat conducting paste may comprise a mixture of a heat conducting powder in a polymeric resin, the heat conducting powder optionally being selected from at least one of aluminium powder, alumina powder and copper powder, or a mixture of at least two of these powders.

Typically, the tube has an outside diameter of from 6 to 10 mm and a wall thickness of from 0.5 to 1 mm. Preferably, a plurality of spaced heating elements defines a serpentine path formed by a common tube. The lateral spacing of the spaced heating elements of the serpentine path may be from 20 to 200 mm, optionally 75 to 125 mm.

In a particularly preferred embodiment, the mould body comprises a plurality of laterally arranged heating zones, each zone having a respective common tube defining a respective serpentine path for each zone. The plurality of laterally arranged heating zones may comprise at least two of a blade root area, a spar cap area, a foam core area and a flange area, each area being shaped to mould a corresponding portion of a wind blade. Optionally, each heating zone has a common tube of 30 to 60 meters in length, and inlet and outlet ends of the common tube are adjacent at an edge of the zone. The lateral spacing of the spaced heating elements in each zone is preferably substantially uniform.

The mould may further comprise a liquid supply system connected to the at least one tube for supplying heated pressurized liquid to the at least one heating tube. The liquid supply system may be adapted to supply a liquid heating medium at a pressure of from 4 to 20 bar, optionally 6 to 12 bar, for example about 10 bar. Typically, the liquid supply system includes a supply of ethylene glycol as the liquid heating medium.

In order to overcome all the disadvantages of using water, without resorting to silicone heat transfer oil, it is a preferred aspect of the present invention to use a higher boiling point fluid. The ideal fluid should be:
1. Stable at temperatures of 100-120 C.
2. Low in cost.
3. Not especially harmful to the blade materials.
4. Non flammable or low in flammability.
5. Non corrosive.
6. High in specific heat capacity.
7. Low in viscosity.

After research and experimentation, it was discovered that an ideal heat transfer fluid is pure ethylene glycol.

If pure ethylene glycol is used for the mould heating, the user may obtain the following novel advantages:
1. The mould can be heated up to 130 C without breakdown of the heat transfer fluid or boiling.
2. Any spills can be cleaned up easily with water.
3. The fluid is not particularly aggressive to the blade material, and does not cause bonding defects in minute quantities.
4. The fluid prevents corrosion.
5. The fluid is of suitable viscosity for being pumped by centrifugal, vane or gear pumps.

A disadvantage is that specific heat capacity of ethylene glycol is roughly one half that of water, so the pump flow rate needs to be doubled for equivalent heat transfer. Still, ethylene glycol's specific heat is far superior to that of mineral oil or silicone oil.

Specific heat of some mould heating fluid candidates, at 25 C:

| Water | 4180 | j/kg-k |
|---|---|---|
| Ethylene Glycol | 2350 | j/kg-k |
| Mineral Oil | 1670 | j/kg-k |
| Silicone Oil | 1588 | j/kg-k |

According to this preferred aspect of the present invention, pure or diluted ethylene glycol or propylene glycol is used as a heat transfer fluid which is conveyed along a plurality of circulation pipes of a heating system for the heat transfer fluid, which pipes are provided between a main structure layer on the back side of a wind turbine blade mould and a surface layer on the moulding side of the wind turbine blade mould, the mould being made from a composite laminate According to a preferred embodiment, ethylene glycol, propylene glycol or a mixture of ethylene glycol and propylene glycol make up more than 25% of the heat transfer fluid, by volume. It is particularly preferred that pure ethylene glycol or propylene glycol make up 100% of the heat transfer fluid, by volume.

In a preferred embodiment, the mould body comprises a plurality of laterally arranged heating zones, each zone having a respective common tube defining a respective serpentine path for each zone, and the liquid supply system is adapted to supply each zone with pressurized liquid at a substantially uniform differential pressure. Optionally, the liquid supply system is adapted to supply each zone with liquid at a substantially uniform liquid flow rate, for example at least 1 meter/second.

The present invention further provides a method of moulding a wind turbine blade using the mould of the present invention, the method comprising disposing a fibre-reinforcement in a curable resin adjacent to the front moulding surface, and conveying a heated liquid through the at least one tube to accelerate curing of the curable resin to form a fibre-reinforced matrix resin composite material.

Optionally, the heated liquid is at a pressure of from 4 to 20 bar, optionally 6 to 12 bar, for example about 10 bar.

Preferably, the mould body comprises a plurality of laterally arranged heating zones, each zone having a respective common tube defining a respective serpentine path for each zone, and the heated liquid is at a substantially uniform differential pressure for each zone and/or the heated liquid is supplied at a substantially uniform liquid flow for each zone, for example at least 1 meter/second. Typically, the heated liquid is ethylene glycol.

The present invention further provides a wind turbine blade produced by the method of the present invention.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1:
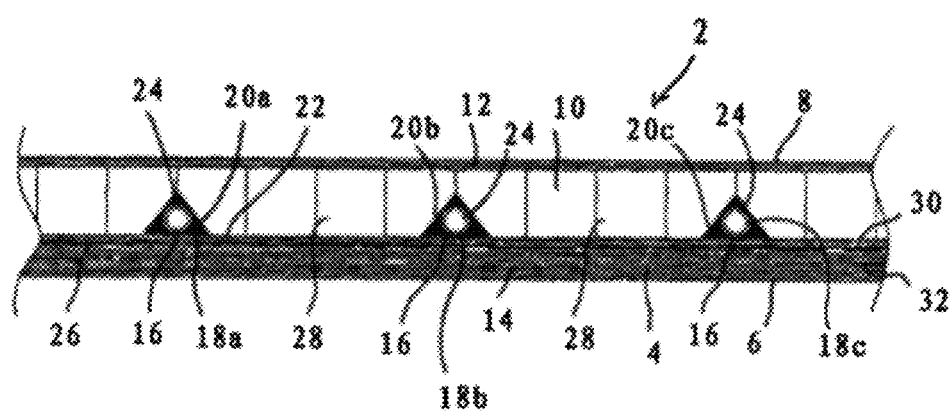
FIG. 1 is a schematic cross-section through a part of a mould for moulding a wind turbine blade according to an embodiment of the present invention.

Referring the Figures, there is shown a mould 2 for moulding a wind turbine blade according to an embodiment of the present invention. FIG. 1 is a schematic cross-section through a part of the mould 2.

The mould 2 comprises a mould body 4 having a front moulding surface 6 and a rear face 8. The mould body 4 comprises a sandwich construction having a central core layer 10 between rear and front layers 12, 14. The core layer 10 is composed of a lightweight material selected from polymeric foam, for example composed of polyethylene terephthalate, or balsa wood. Typically, the core layer 10 is from 6 to 50 mm thick.

The rear and front layers 12, 14 are composed of a fiber reinforced resin matrix composite material. The mould of the present invention is not specific with regard to the type of fiber reinforced composite material used for the mould. All mould materials which are known in the art as being typical for the manufacture of polymeric moulds may be employed. The matrix resin may be epoxy, polyester, vinylester, cyanate ester or a hybrid type. The fibers may be glass, carbon, basalt, aramid, or a hybrid type. However, with view to economy, adequate working time, and resistance to thermal cycling, a glass fiber-epoxy resin matrix composite material is generally preferred.

The mould body 4 has at least one tube 16 therein for conveying a heating liquid therethrough, the at least one tube 16 being located between the core layer 10 and the front layer 14. The at least one tube 16 defines a plurality of spaced heating elements 18a, 18b, 18c. Typically, the tube 16 has an outside diameter of from 6 to 10 mm and a wall thickness of from 0.5 to 1 mm. The lateral spacing of the spaced heating elements 18a, 18b, 18c is typically from 20 to 200 mm, optionally 75 to 125 mm. The plurality of spaced heating elements 18a, 18b, 18c define a serpentine path formed by a common tube 16.

The tube 16 is received in a channel 20 formed in a front surface 22 of the core layer 10. Accordingly, each spaced heating element 18a, 18b, 18c is in a respective channel 20a, 20b, 20c and the channels 20a, 20b, 20c of the spaced heating elements 18a, 18b, 18c are correspondingly laterally spaced. Typically, the channel 20 has a triangular or trapezoidal cross-section. The channel 20 is filled with a heat conducting paste 24 which surrounds the tube 16 in the channel 20. The heat conducting paste 24 preferably comprises a mixture of a heat conducting powder in a polymeric resin, the heat conducting powder optionally being selected from at least one of aluminum powder, alumina powder and copper powder or a mixture of at least two of these materials.

A continuous layer 26 of heat conductive material is located in the thickness direction of the mould body 4 between the plurality of spaced heating elements 18a, 18b, 18c and the front moulding surface 6 and extends laterally across the space 28 between adjacent heating elements 18a, 18b, 18c. The continuous layer 26 of heat conductive material is a mesh, and is typically composed of aluminum, copper or carbon fibres, or a mixture of at least two of these materials. Preferably, the continuous layer 26 of heat conductive metal is disposed within the front layer 14. In the preferred embodiment, the continuous layer 26 of heat conductive metal is disposed between rear and front laminate layers 30, 32 of the front layer 14, the front layer 14 defining the moulding surface 6.

Figure 2:
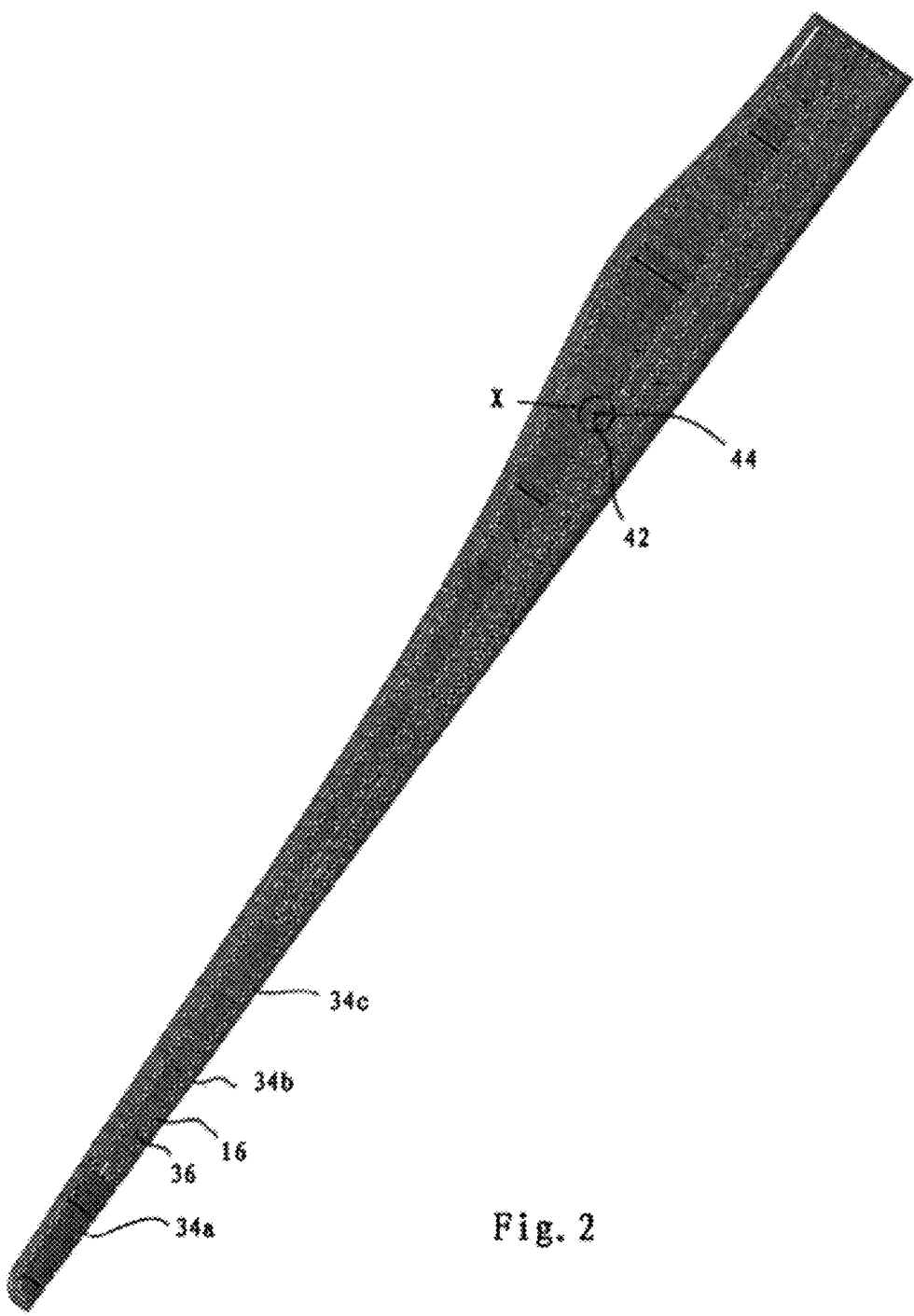
FIG. 2 is a schematic plan view of an array of laterally arranged heating zones in the mould of FIG. 1.

Referring to FIG. 2, the mould 2 comprises a plurality of laterally arranged heating zones 34a, 34b, 34c, etc., only some of the zones being identified with reference numerals in FIG. 2. Each zone 34 has a respective common tube 16 defining a respective serpentine path 36 for each zone 32. The heating zones 34 respectively correspond to particular areas of the wind turbine blade to be moulded, such as a blade root area, a spar cap area, a foam core area and a flange area, each area being shaped to mould a corresponding portion of the wind turbine blade. The heating zones 34 correspond to the blade lamination plan, with root area, spar cap area, foam core area, and flange area separated into independent zones 34.

Typically, each heating zone 34 has a common tube 16 of 30 to 60 meters in length, and inlet and outlet ends 42, 44 of the common tube 16 are adjacent at an edge of the zone 32. One such pair of inlet and outlet ends 42, 44 for a respective heating zone 34 is highlighted in FIG. 2 within the circle marked X. Preferably, in order to provide uniform heating in each zone 34, the lateral spacing of the spaced heating elements 18a, 18b, 18c in each zone 34 is substantially uniform.

Figure 3:
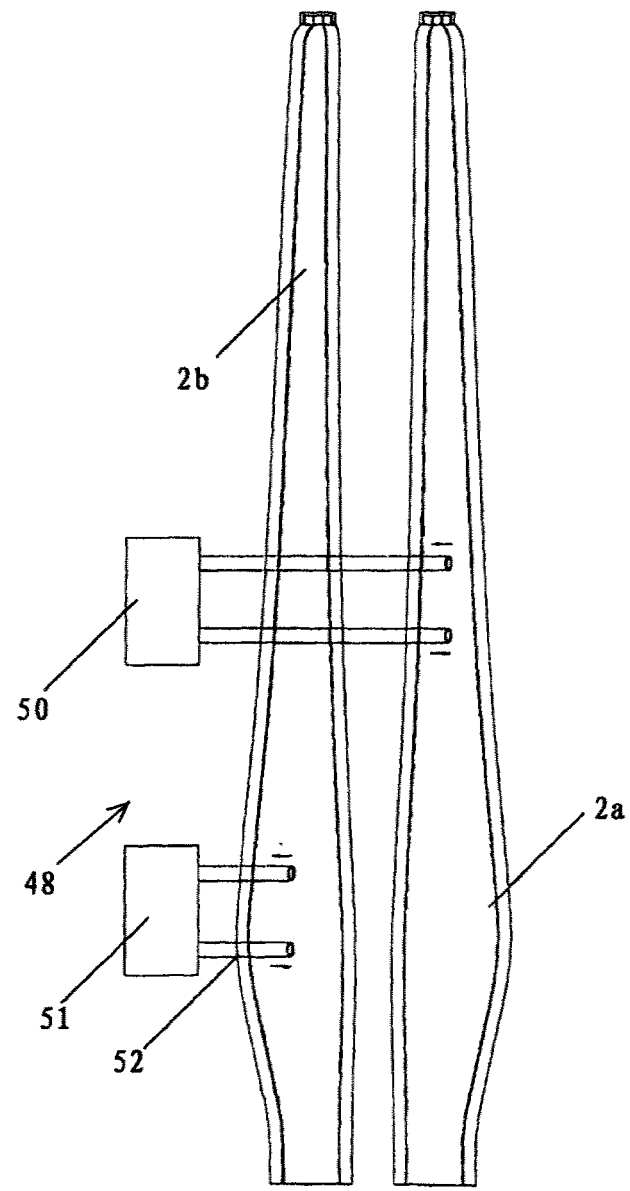
FIG. 3 is a schematic view of the overall heating system.

Referring to FIG. 3, each wind turbine blade is moulded between two moulds 2a, 2b, the two moulds comprising an upper mould 2a and a lower mould 2b The zonal configuration of the heating zones 34 of the upper and lower moulds 2a, 2b may be the same or different. In particular, each opposing mould half can have a dedicated zonal configuration for the respective heating zones 34.

Figure 4:
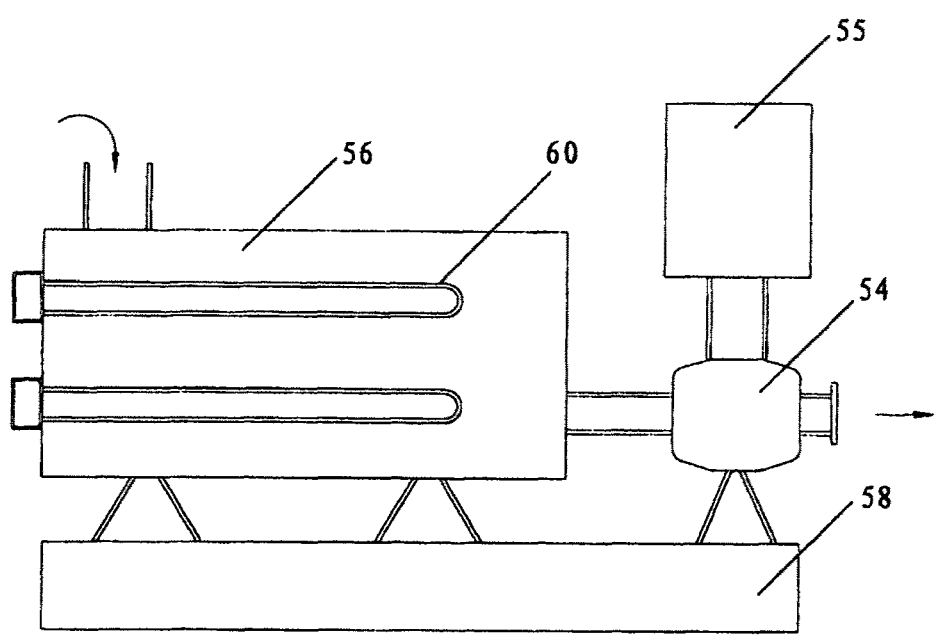
FIG. 4 is a simplified diagram of the heating and recirculating boiler.

Referring to FIGS. 3 and 4, the heated liquid supply system 48 according an embodiment includes for each of the upper blade mould 2a and the lower blade mould 2b a respective boiler unit 50, 51, which is connected to the common tubes 16, acting as heating fluid circulation pipes, by means of connection hoses 52. Only one pair of hoses 52 for each mould 2a, 2b is shown in FIG. 3 but plural hoses 52 may be provided for supplying respective zones 34. The connection hoses 52 connect to the zones 34 as required. As shown in FIG. 4, each boiler unit 50, 51 comprises a recirculation pump 54, a pump motor 55 and a boiler tank 56. The pump 54 and the tank 56 are mounted on a common base plate 58. The tank 56 is connected to a heat transfer fluid supply (not shown) and provided with an electric heating element 60 therein for heating the heat transfer fluid fed into the tank 56. The heated heat transfer fluid is pumped by the pump 55 into and out of the tubes 16.

The heated liquid supply system 48 is therefore connected to the at least one tube 16 for supplying heated pressurized liquid to the spaced heating elements 18a, 18b, 18c in the zones 34. The liquid supply system 48 is adapted to supply a liquid heating medium, preferably ethylene glycol, at a pressure of from 4 to 20 bar, optionally 6 to 12 bar, for example about 10 bar. Each zone 34 is supplied with pressurized liquid at a substantially uniform differential pressure, so that the pressure across the entire mould 2 is uniform, and at a substantially uniform liquid flow rate, for example at least 1 meter/second. A triple pipe arrangement (not shown) is used for the flow manifold under the mould 2, such that all zones 34 have the same differential pressure, allowing a uniform heating without complicated controls.

The mould 2 is used to mould a product such as a wind turbine blade by disposing a fibre-reinforcement in a curable resin adjacent to the front moulding surface, and conveying a heated liquid through the at least one tube to accelerate curing of the curable resin to form a fibre-reinforced matrix resin composite material. The fibre-reinforcement in a curable resin may be provided either by prepregs or by initial layup of dry fibers and then subsequent vacuum infusion of resin into the fibres, as is well known to those skilled in the art.

By using a heat conducting continuous layer 26 such as aluminum mesh on the heat output side of the tubular heating elements 18a, 18b, 18c, the distance between heating elements 18a, 18b, 18c can be extended 2-3 times further than in prior moulds which do not incorporate such a heat conducting continuous layer 26. This saves the tube installation time, mould weight, and mould cost. Also, a more uniform mould surface temperature is obtained than by known moulds. Such known liquid heated moulds did not use this heat conduction element, and the space between tubes was seriously limited by the poor thermal conductivity of the mould laminate (~0.35 W/m-k vs. ~200 W/m-k for aluminum mesh).

The heat conducting paste is only required to be used in laterally spaced channels 20 around each tubular heating element 18a, 18b, 18c. In known moulds, the entire space between tubes was filled with heat conducting paste, causing high weight and cost, as well as slow heating of the mould, due to the requirement additionally to heating the large amount of heavy paste. With the preferred embodiment of the present invention, the space between the tubes 16 is filled with the lightweight core 10.

The diameter of the tubes 16 is reduced as compared to known moulds. In known liquid heated moulds, tubes of 12-20 mm outside diameter have been used. With the preferred embodiment of the present invention, the tube outside diameter is reduced to 10 mm or less, and operating pressure is increased from 2-4 bar to about 10 bar.

The liquid heating medium, water, used in known liquid heated moulds, is replaced by ethylene glycol in the preferred embodiment of the present invention, enabling higher process temperatures and an improved post-cure.

According to the preferred embodiment of the present invention, pure or diluted ethylene glycol or propylene glycol is used as the liquid heating medium or heat transfer fluid. It is preferred that ethylene glycol, propylene glycol or a mixture of ethylene glycol and propylene glycol make up more than 25% of the heat transfer fluid, by volume. To obtain a higher boiling point without the need for pressurization, it is especially preferred if the heat transfer fluid comprises 80% or more ethylene glycol or propylene glycol or a mixture of ethylene glycol and propylene glycol by volume, or better 100% pure ethylene glycol or propylene glycol. This is because the ethylene glycol or propylene glycol has much lower vapor pressure than water, and addition of any water greatly reduced the boiling point.

The greater the proportion of ethylene glycol or propylene glycol and the lower the proportion of water will result in an increase in the maximum operation temperature, which is practically limited to 140 C for pure ethylene glycol, but only 120 C for pure propylene glycol.

In the preferred embodiment of the present invention, the heating zones are laid out according to the blade lamination plan, with root area, spar cap area, foam core area, and flange area separated into independent zones. In known liquid heated moulds, the zones for liquid heating were laid out as simple stripes across the entire mould width, making it impossible to tailor the heating temperature heating to the process requirement.

Other modifications will be apparent to those skilled in the art and are within the scope of the present invention as defined in the appended claims.

The invention claimed is:

1. A mould for moulding a wind turbine blade, the mould comprising:
    a mould body having a front moulding surface and a rear face, the mould body comprising a sandwich construction having a central core layer between front and rear layers respectively comprising the front moulding surface and the rear face, and the core layer being composed of a lightweight material selected from polymeric foam or balsa wood,
    the mould body having at least one cylindrical tube therein defining a plurality of laterally spaced heating elements for conveying a heating liquid therethrough, the at least one tube being disposed between the core layer and the front layer, wherein each spaced heating element is received in a respective channel of triangular or trapezoidal cross-section formed between the front moulding surface and the core layer and the channels are correspondingly laterally spaced and wherein each channel is filled with a heat conducting paste which surrounds the heating element in the channel, and
    a continuous layer of heat conductive material located in the thickness direction of the mould body between the plurality of laterally spaced heating elements and the front moulding surface and extending laterally across the space between adjacent heating elements, wherein the continuous layer of heat conductive material is disposed between rear and front laminate layers of the front layer, and the front laminate layer defines the front moulding surface.

2. A mould according to claim 1 wherein the continuous layer of heat conductive material is a mesh.

3. A mould according to claim 2 wherein the mesh is composed of aluminum, copper, or carbon fibres, or a mixture of at least two of these materials.

4. A mould according to claim 1 wherein the polymeric foam of the core layer is polyethylene terephthalate.

5. A mould according to claim 1 wherein the core layer is from 6 to 50 mm thick.

6. A mould according to claim 1 wherein the heat conducting paste comprises a mixture of a heat conducting powder in a polymeric resin.

7. A mould according to claim 6 wherein the heat conducting powder is selected from at least one of aluminum powder, alumina powder and copper powder, or a mixture of at least two of these powders.

8. A mould according to claim 1 wherein the tube has an outside diameter of from 6 to 10 mm and a wall thickness of from 0.5 to 1 mm.

9. A mould according to claim 1 wherein the at least one tube is a common tube, and the plurality of spaced heating elements define a serpentine path formed by the common tube.

10. A mould according to claim 9 wherein the lateral spacing of the spaced heating elements of the serpentine path is from 20 to 200 mm.

11. A mould according to claim 9 wherein the mould body comprises a plurality of laterally arranged heating zones, each zone having a respective common tube defining a respective serpentine path for each zone.

12. A mould according to claim 11 wherein the plurality of laterally arranged heating zones is selected from the group consisting of at least two of a blade root area, a spar cap area, a foam core area and a flange area, each area being shaped to mould a corresponding portion of the wind blade.

13. A mould according to claim 11 wherein each heating zone has a respective common tube of 30 to 60 meters in length, and inlet and outlet ends of the common tube are adjacent at an edge of the zone.

14. A mould according to claim 11 wherein the lateral spacing of the spaced heating elements in each zone is substantially uniform.

15. A mould according to claim 1 further comprising a liquid supply system connected to the at least one tube for supplying the heating liquid to the at least one heating tube, the heating liquid being pressurized.

16. A mould according to claim 15 wherein the liquid supply system is adapted to supply the pressurized heating liquid at a pressure of from 4 to 20 bar.

17. A mould according to claim 15 wherein the liquid supply system includes a supply of ethylene glycol as the pressurized heating liquid.

18. A mould according to claim 15 wherein the mould body comprises a plurality of laterally arranged heating zones, each zone having a respective common tube defining a respective serpentine path for each zone, and the liquid supply system is adapted to supply each zone with the pressurized heating liquid at a substantially uniform differential pressure.

19. A mould according to claim 18 wherein the liquid supply system is adapted to supply each zone with the pressurized heating liquid at a substantially uniform liquid flow rate.

20. A mould according to claim 16, wherein the pressure is from 6 to 12 bar.

21. a mould according to claim 20, wherein the pressure is about 10 bar.

22. A mould according to claim 19, wherein the liquid flow rate is at least 1 meter/second.

23. A mould according to claim 9 wherein the lateral spacing of the spaced heating elements of the serpentine path is from 75 to 125 mm.

* * * * *